United States Patent [19]
Fahey et al.

[11] 3,724,146
[45] Apr. 3, 1973

[54] VIBRO-GYRATORY MILLS

[75] Inventors: Denis Fahey; Reginald L. Clarke, both of Newcastle-under-Lyme, England

[73] Assignee: William Boulton Limited, Burslem, Stoke-on-Trent, Great Britain

[22] Filed: Jan. 4, 1971

[21] Appl. No.: 103,560

[30] Foreign Application Priority Data

Nov. 4, 1969 Great Britain.....................53,929/69

[52] U.S. Cl....................................51/163, 241/175
[51] Int. Cl. ......B24b 31/00, B24b 1/00, B02c 17/14
[58] Field of Search ......51/163, 313; 241/69, 79, 80, 241/175, 24

[56] References Cited

UNITED STATES PATENTS

| | | | |
|---|---|---|---|
| R27,084 | 3/1971 | Balz | 51/163 |
| 3,514,907 | 6/1970 | Strom | 241/175 X |
| 3,407,542 | 10/1968 | McKibben | 241/175 X |
| 3,422,577 | 1/1969 | McKibben | 241/175 X |
| 3,553,900 | 1/1971 | McKibben | 51/313 |
| 3,633,321 | 1/1972 | Rise | 51/163 |

*Primary Examiner*—Robert L. Spruill
*Attorney*—Breitenfeld and Levine

[57] ABSTRACT

A vibro-gyratory grinding or finishing mill with an annular treatment chamber round which the charge of workpieces and media progresses under the influence of the vibratory movement, separation of workpieces and media being effected by exposing a normally covered screen to the charge, one component the charge falling through the screen and back into the chamber and the other component being retained by the screen and delivered to a discharge opening.

7 Claims, 3 Drawing Figures

VIBRO-GYRATORY MILLS

This invention relates to vibro-gyratory mills which may be used for grinding, polishing, de-burring or similar finishing operations and which effect such operations by means of a vibratory action in the form of a high frequency rotary oscillation about a vertical axis with an upward and downward component in the movement, such action being applied to a charge of workpieces or material, usually mixed with discrete finishing media, contained in the mill.

The term "workpieces" used hereinafter should be construed as referring not only to components to be polished, de-burred or otherwise finished but also to materials which require to be ground or powdered.

The invention is concerned with the unloading of such mills and the separation of the workpieces from the media.

The invention provides a vibro-gyratory mill having a processing or treatment chamber which is of annular shape in plan and has an upward slope in the floor, a vibratory mechanism serving to promote progression of a charge of workpieces and media around said chamber, a separating chamber including a horizontal separating screen at a level below that of the upper end of said floor, an outlet through which, after screening, separated workpieces can be discharged from the machine, means for returning the media to the lower end of the floor of said treatment chamber, and deflector means selectively movable between an operative position in which the charge is directed from the upper end of said floor to said separating chamber and an inoperative position in which the charge returns to the lower end of said floor for recirculation.

In one preferred arrangement the floor of the treatment chamber is of helical form with a step connecting the upper and lower ends of the helix whereby the charge climbs up the helix in its progression round the chamber and falls over the step, separating chamber being disposed beneath the upper end of the helix.

The deflector means may be moved between its operative and inoperative positions automatically at predetermined intervals so that processing can be carried out for the desired period before separation of the charge is effected; for instance the upper portion may be actuated electrically, pneumatically or hydraulically, but it may also be manually operated if this should be preferred.

An embodiment of the invention will now be described, by way of example only, with reference to the accompanying drawings, in which.

Figure 1:
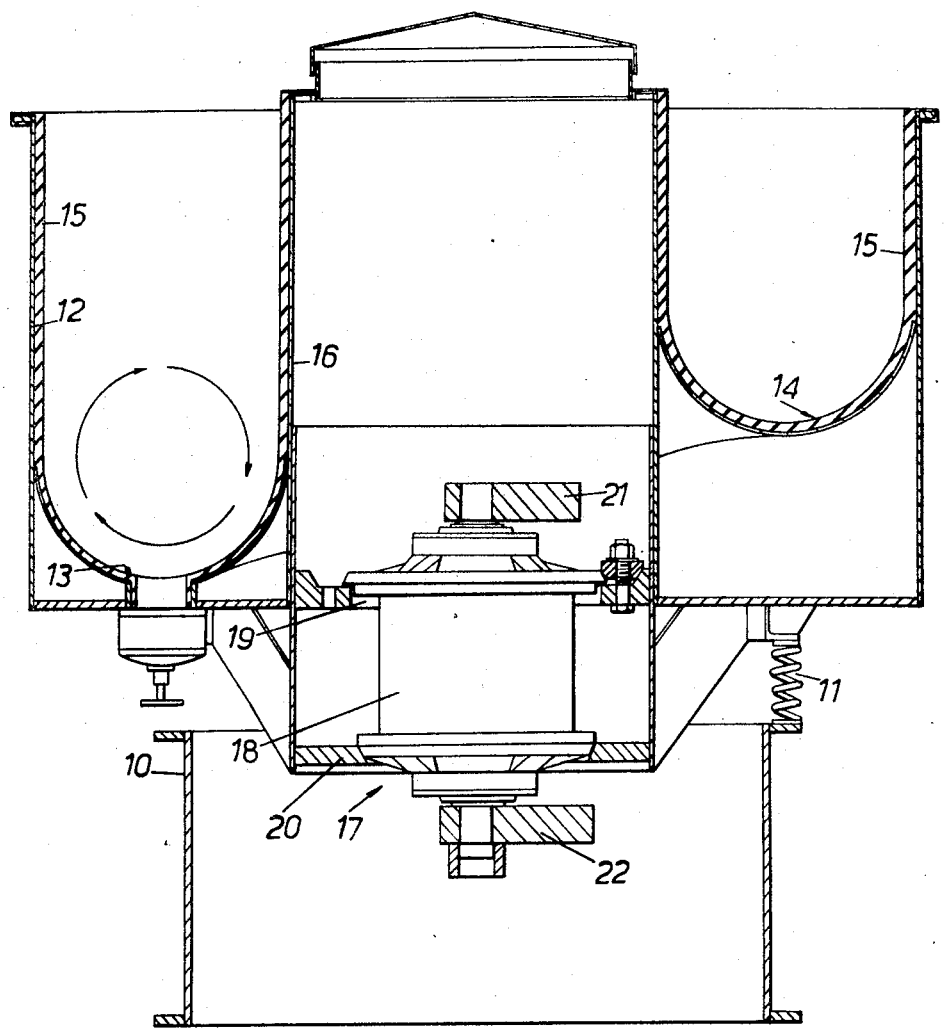
FIG. 1 is a vertical cross-section through a machine according to the invention.
Figure 2:
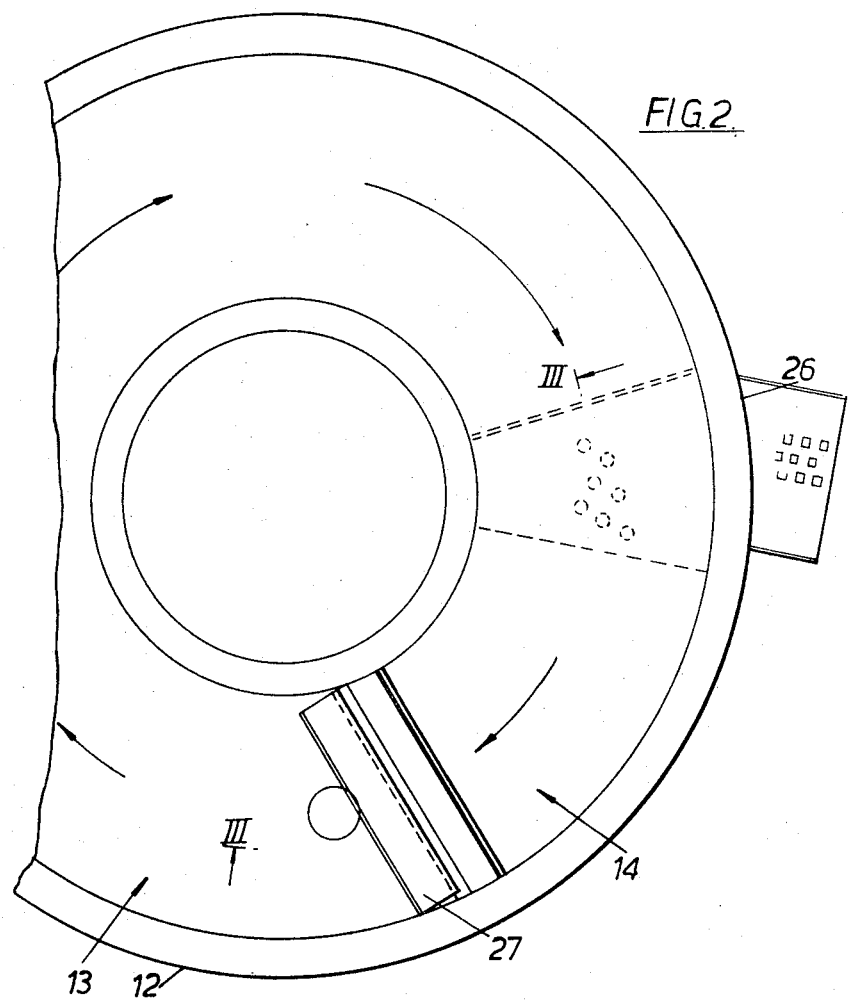
FIG. 2 is a plan view of the machine shown in FIG. 1.

Referring to the drawings, there is shown a vibratory mill comprising a generally cylindrical base portion 10 on which is supported, by a series of coil springs 11, a treatment chamber or bowl 12 of annular shape in plan. The floor of the chamber is of helical form rising from a low level zone 13 to a high level zone 14 from which material which has travelled around and up the helix falls again to the low level zone. The floor of the chamber is of arcuate cross-section and the walls of the chamber are provided with a rubber or other suitable lining 15.

The treatment chamber surrounds a central sleeve 16 also supported on the springs 11 and within which a vibratory unit 17 is located. This comprises a motor 18 carried by upper and lower support rings 19 and 20 and having a shaft which projects from both ends of the motor casing. Eccentric weights 21 and 22 are carried by the respective ends of the motor shaft and are relatively angularly displaceable to control the motion imparted by the motor to the treatment chamber 12. By virtue of the provision of the eccentric weights and the resilient mounting of the motor and the treatment chamber on the springs 11, rotation of the motor imparts to the treatment chamber a high frequency rotary oscillation about the central axis of the chamber having an upward and downward component in the movement. This movement causes a charge of workpieces and media in the chamber to undergo generally orbital movement in substantially vertical planes while moving up and around the chamber from the low level to the high level zones. During the movement the media act upon the workpieces to effect a grinding, finishing or like action which can be varied depending on the speed of rotation and the relative angular displacements of the eccentric weights 21 and 22.

Figure 3:
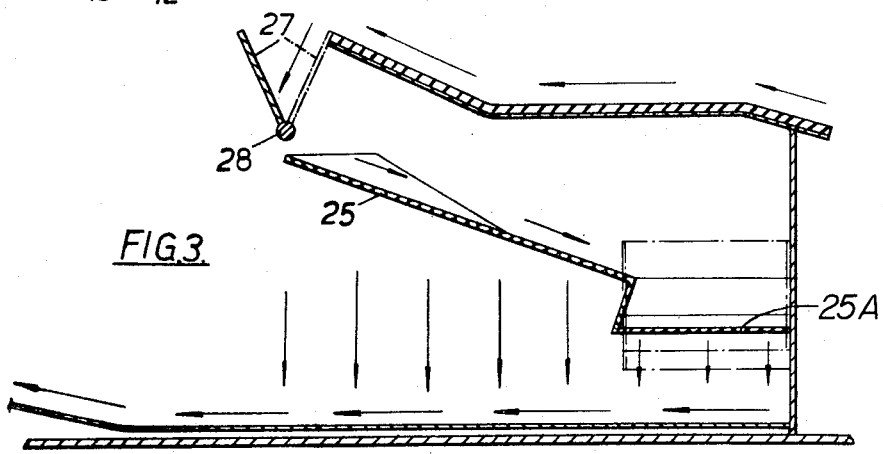
FIG. 3 is a section on the line III—III in FIG. 2.

As best seen in FIG. 3, below the upper end of the chamber floor is a separating chamber including an inclined sieve or screen 25 which slopes downwardly and rearwardly (relative to the direction of movement of the charge around the treatment chamber) to a horizontal screen 25A leading to a discharge opening 26 in the outer wall of the separating chamber. A deflector plate 27 is pivotally connected to the upper end of the screen 25 about a transverse horizontal axis 28. This deflector plate may be moved by any suitable manual or automatic means (not shown) between an operative position shown in full lines and an inoperative position shown in broken lines.

In the operative position the charge falling from the high level zone of the treatment chamber is intercepted and directed to the separating chamber, one component of the charge being retained by the screen and delivered from the machine by way of the discharge opening 26, and the other component falling through the screen into the base of the separating chamber from whence it is returned, under the influence of the vibratory movement, to the lower end of the treatment chamber for re-use. Where parts are being finished, the parts will generally be larger than the media so that the parts will be discharged and the media returned through the screen for re-use. In the case of material which is being ground or powdered or where parts to be finished are smaller than the media, an additional collecting tray or the like would be required to receive the material passing through the screen for delivery to a discharge outlet, the media returning from the outlet end of the screen to the treatment chamber.

When the deflector plate is in its inoperative position the charge of workpieces and media falls back into the bottom of the treatment chamber for recirculation without separating. This can be effected as often as desired and the movement of the deflector plate may be arranged to be effected automatically after the charge has been recirculated a desired number of times. It should be noted that the level at which separation and discharge takes place, that is, the level of the screen 25A is actually below the level of the bottom of the treatment chamber at the point at which parts and media are introduced into the treatment chamber, the media discharged through the screen 25A returning in the direction of the arrows in FIG. 3 under the influence of the vibratory movement.

We claim:

1. In a vibro-gyratory mill having a processing or treatment chamber which is of annular shape in plan and a vibratory mechanism serving to promote progression of a charge of workpieces and media around said chamber, the improvement comprising a separating chamber disposed beneath the floor of said chamber and including a separating screen and an outlet through which, after screening, separated workpieces can be discharged from the machine, means for returning the media to the treatment chamber, and deflector means selectively moveable between a discharge position in which the charge is directed into said separating chamber and a recirculation position in which the charge continues round the chamber.

2. In a vibro-gyratory mill having a processing or treatment chamber which is of annular shape in plan and has an upward slope in the floor with a step connecting the upper and lower ends of the floor, and a vibratory mechanism serving to promote progression of a charge of workpieces and media around said chamber, the improvement comprising a separating chamber disposed beneath the upper end of said floor and including a separating screen and an outlet through which, after screening, separated workpieces can be discharged from the machine, means for returning the media to the lower end of the floor of said treatment chamber, and deflector means at the upper end of said floor selectively movable between a discharge position in which the charge is directed beneath the upper end of said floor into said separating chamber and a recirculation position in which the charge is directed back to the lower end of said floor for recirculation.

3. A vibro-gyratory mill according to claim 2 wherein said deflector means comprises a deflector plate pivotally movable about a horizontal axis extending transversely of said treatment chamber at a level below that of the upper end of said floor.

4. A vibro-gyratory mill according to claim 2 wherein said separating chamber includes an inclined screen sloping downwardly from said deflector means to said separating screen, said horizontal axis being located at the upper end of said inclined screen.

5. A vibro-gyratory mill according to claim 2 wherein said separating screen is disposed at a level below that of the lower end of said floor, the media discharged through the 6. A vibro-gyratory mill according to claim 2 wherein said treatment chamber is resiliently mounted and is vibrated by means of a motor secured to the treatment chamber and carrying eccentric weights.

7. A vibro-gyratory mill according to claim 2 wherein the floor of said treatment chamber is of arcuate cross-section.

* * * * *